Jan. 5, 1954 W. L. KERLIN 2,665,168
ATMOSPHERIC CONDITIONING METHOD AND APPARATUS
Filed April 19, 1948 4 Sheets-Sheet 1

INVENTOR.
WILLIAM L. KERLIN
BY George B. White
ATTORNEY

INVENTOR.
WILLIAM L. KERLIN
BY George B. White
ATTORNEY

INVENTOR.
WILLIAM L. KERLIN
BY George B. White
ATTORNEY

Patented Jan. 5, 1954

2,665,168

UNITED STATES PATENT OFFICE 2,665,168

ATMOSPHERIC CONDITIONING METHOD AND APPARATUS

William L. Kerlin, Los Angeles, Calif., assignor to Clellan Ross Pleasants

Application April 19, 1948, Serial No. 21,778

8 Claims. (Cl. 299—28)

This invention relates to method of dispersing or preventing fog or the like, and an apparatus for the same.

The primary object of this invention is to liberate into the atmosphere a refrigerant gas and the residue of vaporization of a hygroscopic material in the presence of heat so that the gas and residue are discharged in ascending currents spreading over an area which widens as it ascends; more particularly an object of this invention is to vaporize by heat a halogen compound, such as calcium chloride, and dispense the gaseous chlorine and other products of said heat vaporization into the atmosphere through heated air currents for conditioning the atmosphere in a comparatively large area.

Another object of the invention is to provide a solid substance in a selected proportion which may function as a nucleus around which moisture may form and be precipitated, said substance being adapted to float in the atmosphere in an expanding area.

Another object of the invention is to provide a method wherein the hygroscopic substance containing a refrigerant component is introduced into a suitably hot flame for vaporization and then carried into an ascending current directing it into the atmosphere.

A further object of this invention is to provide a method and apparatus for vaporizing at a point of high temperature, a hygroscopic substance capable of liberating a refrigerant gas when so vaporized; for instance calcium chloride which when vaporized produces a chlorine gas and a fine almost colloidal solid residue; and then mixing with these at a point of lower temperature a regulated quantity of product of imperfect combustion, for instance a product of a hydrocarbon, such as fuel oil imperfectly combusted at a cooler point of the flame; then dispensing said mixtures in a heated air current so directed as to raise in enlarging circles and in a generally circular motion preferably in contra-clockwise direction.

Another object of the invention is to provide an apparatus wherein a hygroscopic solid can be suitably comminuted and prevented from coalescence, and then introduced to the hottest flame of a burner in predetermined quantities, and wherein means are provided to introduce at will a combustible material to a cooler portion of said flame so that imperfectly combusted carbon particles may mingle with said vaporized hygroscopic particles and enter together into another area of sufficient hotness to create an upward current in a generally spiral dispenser to produce a convection current ascending in enlarging circles for dispensing the said mixture of hygroscopic vapor and its refrigerant products and carbon or mineral particles; the said device being adapted to intermingle a selected quantity of said particles from a very small amount to any desirable degree; the entire apparatus may be mounted upon a portable base for easy handling and transportation.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
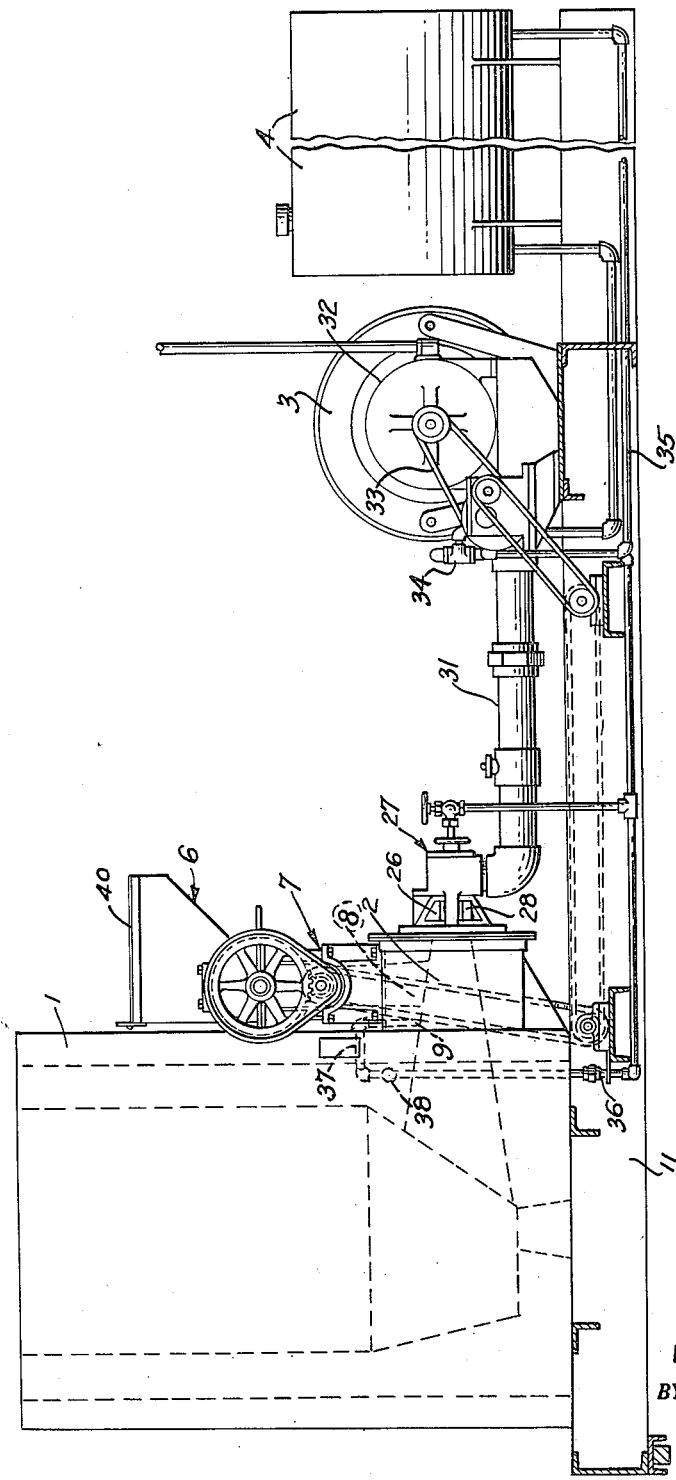
Fig. 1 is a side view of dispensing apparatus.
Figure 2:
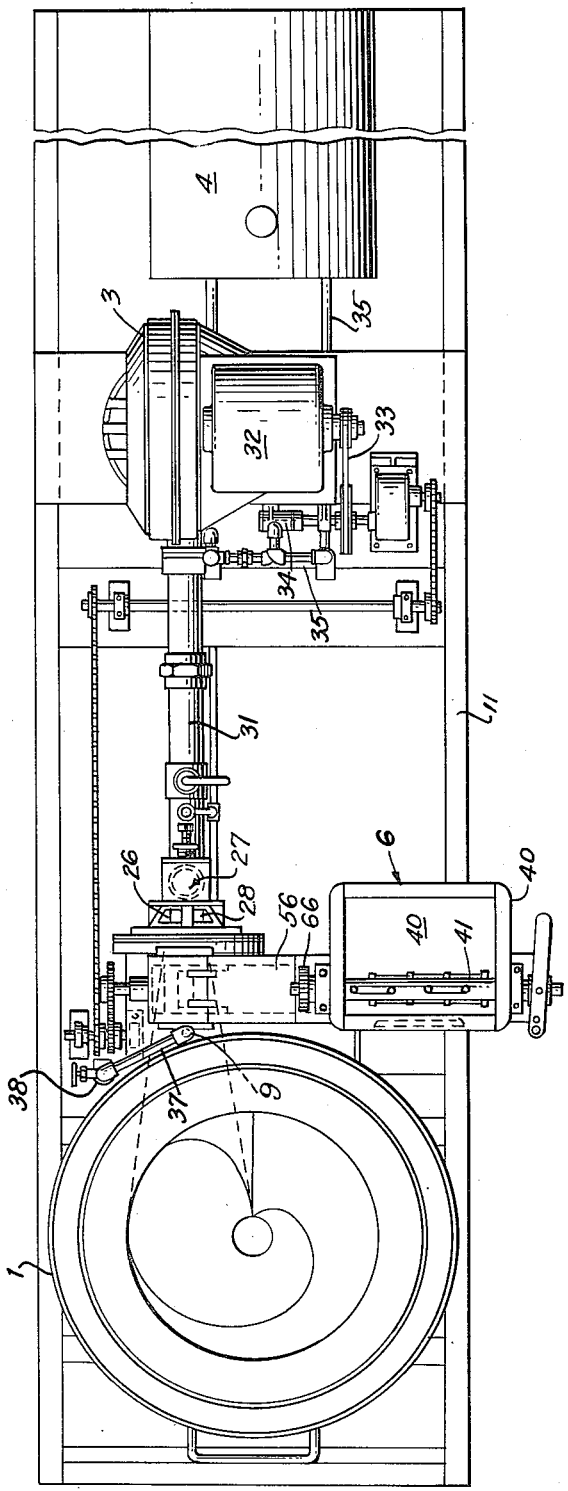
Fig. 2 is a top plan view of the dispensing apparatus.
Figure 3:
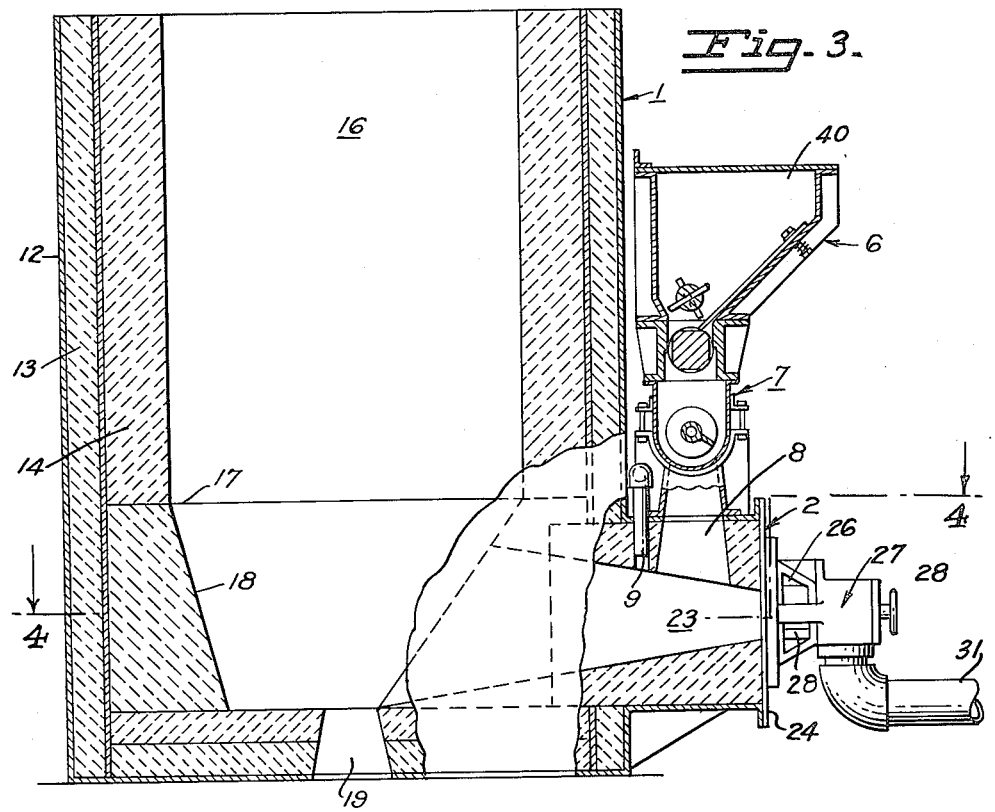
Fig. 3 is a side view of the dispensing pot and the burner and feeder mechanism, with the sides broken away to show the same partly in section.
Figure 4:
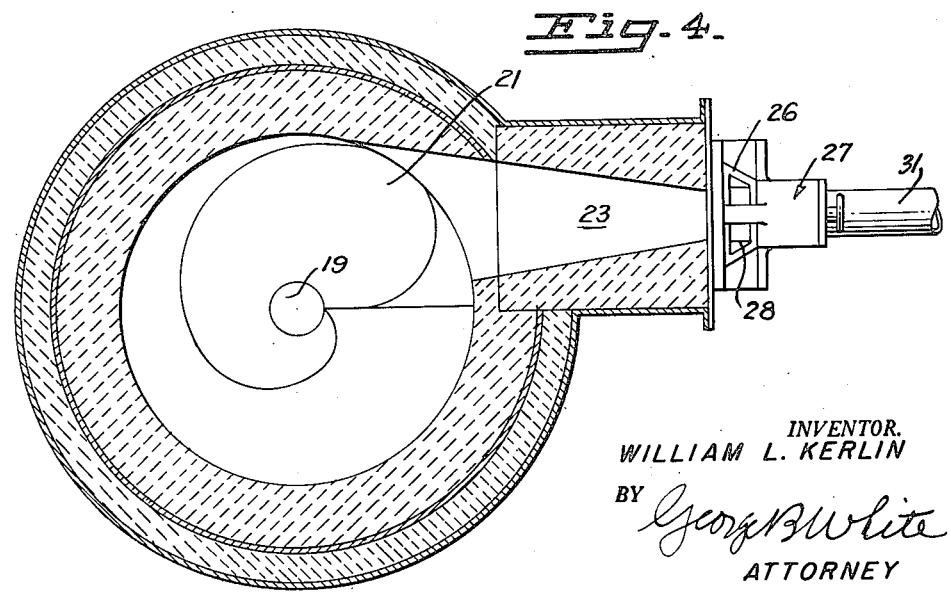
Fig. 4 is a cross sectional view taken substantially on the line 4—4 of Figure 3.
Figure 5:
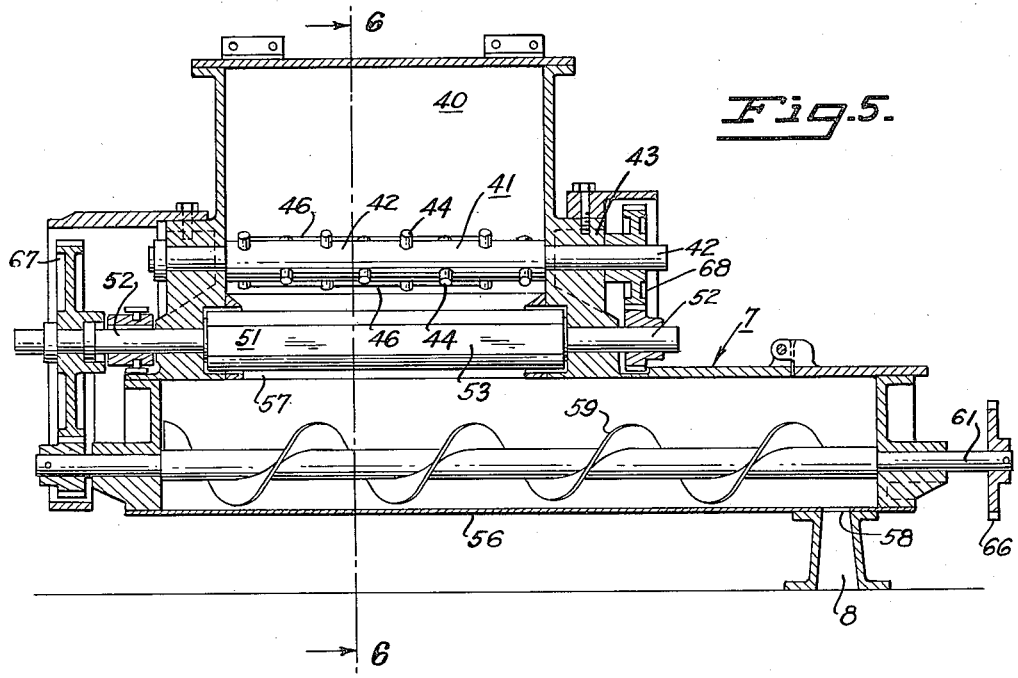
Fig. 5 is a cross sectional view of the agitator and feeder mechanism.

There are various theories to explain the action of hygroscopic materials and refrigerant gases in the atmosphere. One theory is that the introduction of such hygroscopic substance or refrigerant may result in an initial precipitation which in turn starts a chain reaction in the fog to precipitate the fog. The presence of such floating particles will change the relative humidity of the atmosphere to such an extent that it prevents frost as well as it clears the fog. I do not wish to be limited to any of the theories which may apply as a basis for the method or for the results of my device, I rely on experience and practice that the method of dispensing the particles as herein described, clears comparatively large areas from fog or prevents frost, and in general accomplishes a desirable change in atmospheric conditions which in actual operation, for instance, facilitated the landing of airplanes on airfields in fog banks, or otherwise cleared areas bounded by fog. I claim the method and the apparatus in connection with all applications irrespective of what natural phenomena and theory may ultimately be accepted as explanation of the action and results accomplished.

For the carrying out of this method, I provide for the introduction of a hygroscopic substance, in this illustration a halogen compound, such as calicum chloride, in a finely divided state, into an area of such high heat that the calcium chloride vaporizes. Then I introduce the vaporized calcium chloride to an area of somewhat lower heat wherein imperfect combustion may be obtained if so desired. Finally I introduce the mixture of said vaporized calcium chloride and the product of said imperfect combustion together into another heated area which causes an ascending current directed to introduce the mixture into the atmosphere in ascending air currents.

Particularly in carrying out the invention I furnish a grinder within the sphere of heat of the apparatus which grinds and maintains the calcium chloride at a desired consistency, and which feeds it in predetermined quantities into the hot flame of a burner. In the present illustrative apparatus the calcium chloride is fed into a flame of about 3000° Fahrenheit. Under the effect of this heat the calcium chloride is vaporized, and then the chloride gas and the calcium residue of substantially colloidal size are driven by the air flow from said burner, and are blown into a directing cylinder or dispenser wherein an ascending air current is created, for carrying the chloride gases and solid particles into the atmosphere in enlarging circles. While in some instances the use of calcium chloride in such a burner provided good results, especially in connection with so-called ground fogs or smogs of comparatively low altitude, yet in other instances it is desirable to introduce some amorphous carbon, the product of imperfect combustion, with which the vapors of calcium chloride may mingle and which float into higher altitudes in still greater areas and form condensation nuclei. In order to regulate the introduction of such carbon particles, I introduce a combustible substance, such as fuel oil, at a cooler portion of the flame. In the present illustrative embodiment of the invention it was found that the introduction of such additional oil at an area beyond the initial combustion where the supply of air is deficient brought best results. Introduction of such oil is regulated to produce any desired amount of carbon particles according to local conditions. The result of such imperfect combustion produces the amorphous carbon with which the said calcium chloride products are intermingled.

In some instances the immediate and direct introduction of this mixture of calcium chloride and carbon particles may be sufficient, but in practice it was found that a directed ascending convection current in enlarging circles is desirable. Therefore, I provide a third area, which in this illustration is cooled to about 1300° Fahrenheit, into which area the mixture of carbon particles and the products of calcium chloride vaporization are blown, and from which area the ascending warmer current is dispensed into the atmosphere. The direction of these currents blown into this area, in this illustration, is by a somewhat spiral path in a generally cylindrical dispenser which imparts a contra-clockwise direction of rotation to the air currents viewing the air currents downwardly toward the ground. Thus the mixture is introduced into the atmosphere by ascending spirally enlarging currents of increasing diameter the direction of circling being generally contra-clockwise viewing the currents downwardly.

In the apparatus for carrying out the aforedescribed method, I provide a dispensing pot 1, on one side of which is a suitable burner block 2 connected to a centrifugal compressor or blower 3 and by a suitable piping system to an oil container 4. Above the burner block 2 there is on the side of the dispensing pot 1 a suitable agitator or grinder 6 which feeds a suitable chemical compound into a conveyor 7, the outlet of which latter is connected by a passage 8 to the top of the burner block 2. An auxiliary oil intake 9 is shown at the upper portion of the burner block 2. The entire unit is mounted on a common base 11 on suitable runners or the like and may be mounted on wheels for transportation when so desired.

In detail the dispensing pot 1 includes a casing 12 with a suitable insulation 13 in which is placed a refractory inner lining 14 to define a generally cylindrical convection chamber 16. The lower portion of the chamber 16 below the line 17 approximately in line with the top of the burner block 2 is generally frusto-conical narrowing downwardly with inclined sides 18. The sides 18 start at the burner block 2 and are formed generally on a spiral with respect to a central bottom opening 19. The spiral side 18 forms a passage 21 into a side of which is recessed the burner block 2. This burner block 2 is made of fire and heat resistant material and it has a generally frusto-conical passage 23 widening toward the burning chamber 16 and being substantially tangential to the intake portion 21 of said burner chamber.

The burner block 2 includes the usual burner plate 24 with suitable vents and openings 26. Through the center of the burner plate 24 extends the usual burner nozzle 27. A rotatable air shutter 28 controls air flow to the inner peripheral portions of the burner block and thereby cools the peripheral area of the flame and protects the lining thereat. The burner nozzle 27 is opposite the narrowest end of the burner block passage 23. Suitable piping generally denoted by 31 connects the burner to the blower 3 which in this instance is a usual turbo blower driven by a suitable electric motor 32.

The electric motor 32 is connected by a gear and sprocket transmission 33 to a pump 34 which by pipes 35 connects to the tank 4 and through another pipe 36 feeds oil to the burner nozzle 27. The piping herein is shown somewhat diagrammatically.

The auxiliary fuel supply for the production of colloidal size carbon is connected to the auxiliary connection 9. This connection is shown as the conduit 37 leading from the conduit 36 to the smoke connection 9 and having a control valve 38 interconnected in the conduit 36 to control the amount of the secondary oil supply and thus regulate the smoke and carbon particles to be produced. The connection 9 is above the burner block 2, and extends downwardly at about midway between the ends of the passage 23 in the burner block 2.

The chemical compound, such as calcium chloride, is furnished through a suitable grinder 6 and conveyor 7. In the present illustration a hopper 40 first receives the calcium chloride therein. In the hopper is a rotary grinder or agitator 41. This grinder or agitator 41 consists of a shaft 42, journalled at its opposite ends in journals 43 on the hopper 40. A plurality of agitator pins 44 extend radially from the agitator shaft 42, staggered alternately at right angles with respect to one another along the length of the shaft 42. Near the outer end of each agitator pin 43 is a hole 45. Wires 46 are extended through the holes 44 and are held on said pins 43, so that as the agitator rotates it agitates the chemical substance in the hopper, the wires 46 cut through the chemical substance and further comminute it.

The bottom of the hopper 40 has a longitudinal opening 47, which is aligned with a passage 48 in a hopper base 49. A regulator rotor 51, in the hopper base 49 has journal stub shafts 52 extended from its opposite ends and journalled in said hopper base 49. The rotor has four symmetrical straight sides 53 so that it is generally of rectangular cross section, with the corners mitered. The peripheral dimensions of the rotor 51 are such that said straight sides 53 are spaced from the vertical walls of the passage 48 and pass the chemical down through said passage 48.

Figure 6:
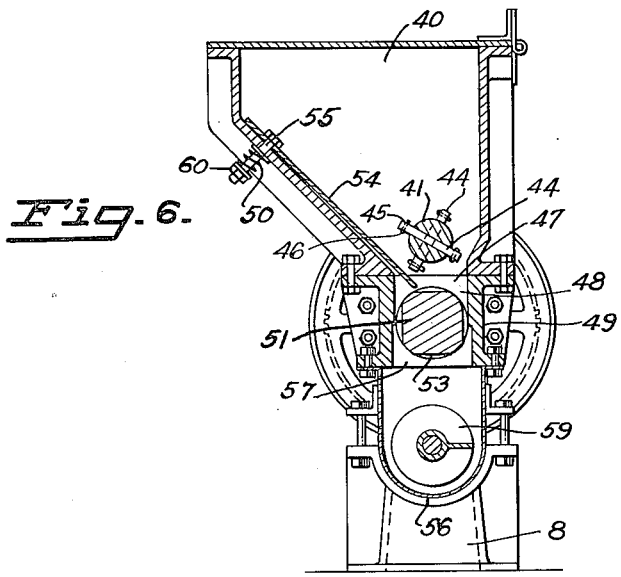
Fig. 6 is a cross sectional view of said agitator and feeder mechanism the section being taken on the line 6—6 of Fig. 5.

A yieldable scraper device extends along one side of the hopper for loosening any mass or lump of chemical that may adhere to the rotor 51 and also to enhance agitating action in the hopper. This scraper device includes a scraper plate 54 along an inclined side of the hopper, with spaced pins 55 slidably extended from the plate 54 through the said inclined wall. Coil springs 59 around each pin 55 between the head 60 of each pin 55 and the outer surface of said inclined wall pull the pin 55 outwardly and form a resiliently yieldable fulcrum near the top of the plate 54. The lower edge of the scraper plate 54 is in contact with the top of the rotor 51, so that as the rotor 51 rotates in clockwise direction viewing Fig. 6, it scrapes off lumps of calcium chloride and may have adhered to said rotor 51. The contour of the rotor 51 vibrates the scraper plate so that the plate also loosens lumps or masses of calcium chloride between it and the agitator shaft 42. Due to the vicinity of the agitator and feeder device to the outside of the dispensing pot 1 and to the burner block 2 heat is transmitted to said hopper and to said feed trough with drying effect on the calcium chloride therein, and thereby clogging of the device is further prevented.

The hopper is offset to one side with respect to the burner block 2 and a closed feeder casing 56 extends along the underside of the hopper and then to above the burner block 2. The top of the feeder casing 56 has an inlet opening 57 aligned with the hopper base passage 48 to receive the chemical therefrom. An outlet opening 58 on the underside of the feeder casing 56 feeds into the feed chute 8 and into about the middle of the burner block 2, where the flame is the hottest. A conveyor screw 59 works in the feed casing or trough 56 to advance the chemical from said inlet opening 57 to said feed chute 8. The reduced ends 61 of said conveyor screw 59 are journalled in the ends of the trough or casing 56 and extend beyond them for driving purposes.

A chain and sprocket chain and sprocket transmissions generally denoted by the numeral 66, drives the shaft 61 of the conveyor screw 59. The other end of said screw 59 is connected by gears 67 to an end 52 of the regulator rotor 51. The other end shaft 52 of said rotor 51 is connected by gears 68 to the end of the grinder shaft 42. Thus the feeder, regulator and grinder are operated in synchronism.

In operation the burner is put on and started and is allowed to run for a certain time in order to heat up the block 2. Then a suitable clutch is thrown in to start the feeding of calcium chloride. It is to be noted that the calcium chloride feeds close to the heart of the flame from the burner, which in the present instance is maintained at a high temperature as heretofore described. The calcium chloride releases chlorine gas and substantially colloidal residue which is carred by the draft into the spiral lower portion 18 of the dispensing block 1, and it is emitted in ascending convection currents from the top of the dispenser block into the atmosphere. If it is so desired then the supplemental oil valve 38 is adjusted to allow a certain amount of oil to be conducted to the line 9 and be introduced to a point above the flame. This supplemental oil is received in the cooler peripheral portion of the flame or the area in the burner block, as determined by the burner vent 26. The oil thus dropping into the flame will not burn completely but the imperfect combustion will produce amorphous carbon particles which are then intermixed with the vaporized products of the calcium chloride and emitted from the dispenser in the manner heretofore described.

It is to be noted that the feeding mechanism is such that, according to the regulated speed, it introduces the calcium chloride, or like chemical, to the burner intermittently.

I claim:

1. In a method of changing the humidity of the atmosphere, the introducing of calcium chloride over the hottest portion of a burner flame, the introducing of a combustible substance to a cooler portion of the burner plane for imperfect combustion, the mixing of the product of calcium chloride vaporization and the imperfect product of combustion in the presence of heat, and emitting the same in ascending convection currents in generally contraclockwise direction.

2. In an apparatus of the character described, a dispensing pot, a burner block in one side of the dispensing pot, both blocks and pot being heat resistant, a burner for producing heat in said burning block, a comminuting and dispensing device above said burner for feeding a substance containing a fog dissipating component into the hottest portion of said burner block, and means to force the products of combustion from said burner block into said dispensing pot, said dispensing pot including a dispensing chamber open to the atmosphere, a spiral chamber below the dispensing chamber, said burner block discharging substantially tangentially into said spiral chamber.

3. In an apparatus of the character described, a dispensing pot, a burner block in one side of the dispensing pot, both blocks and pot being heat resistant, a burner for producing heat in said burning block, a comminuting and dispensing device above said burner for feeding a substance containing a fog dissipating component into the hottest portion of said burner block, and means to force the products of combustion from said burner block into said dispensing pot, said dispensing pot including a dispensing chamber open to the atmosphere, a spiral chamber below the dispensing chamber, said burner block discharging substantially tangentially into said spiral chamber, and means to introduce carbon particles above said flame on the top of the burner block spaced from said spiral chamber.

4. In an apparatus of the character described, a dispensing pot, a burner block in one side of the dispensing pot, both blocks and pot being heat resistant, a burner for producing heat in said burning block, a comminuting and dispensing device above said burner for feeding a substance containing a fog dissipating component into the hottest portion of said burner block, and means to force the products of combustion from said burner block into said dispensing pot, said dispensing pot including a dispensing chamber open to the atmosphere, a spiral chamber below the dispensing chamber, said burner block discharging substantially tangentially into said spiral chamber, said spiral chamber having a vent in the bottom thereof.

5. In an apparatus of the character described, a dispensing pot, a burner block in one side of the dispensing pot, both blocks and pot being heat resistant, a burner for producing heat in said burning block, a comminuting and dispensing device above said burner for feeding a substance containing a fog dissipating component into the hottest portion of said burner block, and means to force the products of combustion from said burner block into said dispensing pot, said dispensing pot including a dispensing chamber open to the atmosphere, a spiral chamber below the dispensing chamber, said burner block discharging substantially tangentially into said spiral chamber, and means to introduce carbon particles above said flame on the top of the burner block spaced from said spiral chamber, and means to regulate said carbon introducing means.

6. In an apparatus of the character described, a dispensing pot open to the atmosphere, a burner block communicating with the lower portion of said pot, a burner device to produce vaporizing heat in said burner block for vaporizing a substance for changing the humidity of the atmosphere, a blower device for said burner, means to supply a combustible substance to said burner, air vents for cooling the inner peripheral portions of the burner block, and means to feed into the hottest portion of the burner block a substance containing a component capable to change the relative humidity of the atmosphere upon vaporization, and controlled means to introduce carbon particles producing material into the cooled portion of said burner block.

7. In an apparatus of the character described, the combination with a dispensing pot and a burner block discharging products of combustion and vaporization into said pot; of a hopper adjacent to and being heated by said pot, a rotating agitating element in the hopper, said hopper having a discharge passage, a rotating regulator member in said passage to regulate transfer through said passage, a trough below said passage for receiving said material, an outlet on said trough spaced to one side from said hopper, and a conveyor device in said trough to feed said material in said trough to said outlet, the outlet of said trough being aligned and feeding into the middle of said burner block.

8. In an apparatus of the character described, the combination with a dispensing pot and a burner block discharging products of combustion and vaporization into said pot; of a hopper adjacent to and being heated by said pot, a rotating agitating element in the hopper, said hopper having a discharge passage, a rotating regulator member in said passage to regulate transfer through said passage, a trough below said passage for receiving said material, an outlet on said trough spaced to one side from said hopper, and a conveyor device in said trough to feed said material in said trough to said outlet, the outlet of said trough being aligned and feeding into the middle of said burner block, and a vibrating scraper in said hopper held in contact with said rotating regulator member to free lumps of material therearound.

WILLIAM L. KERLIN.

References Cited in the file of this patent

UNITED STATES PATENTS

| Number | Name | Date |
|---|---|---|
| 857,742 | Lanquist | June 25, 1907 |
| 997,728 | Worthen | July 11, 1911 |
| 1,112,234 | Stuart | Sept. 27, 1914 |
| 1,190,168 | Holly | July 4, 1916 |
| 1,336,285 | Critchett | Apr. 6, 1920 |
| 1,397,792 | Best | Nov. 22, 1921 |
| 1,665,344 | Caracristi | Apr. 10, 1928 |
| 1,801,431 | Irish | Apr. 21, 1931 |
| 2,052,626 | Houghton, Jr. | Sept. 1, 1936 |
| 2,068,987 | King, Jr. | Jan. 26, 1937 |
| 2,232,728 | Pleasants | Feb. 25, 1941 |